Dec. 15, 1931.  W. TRINKS  1,836,412
REGENERATOR
Filed March 26, 1930  2 Sheets-Sheet 1
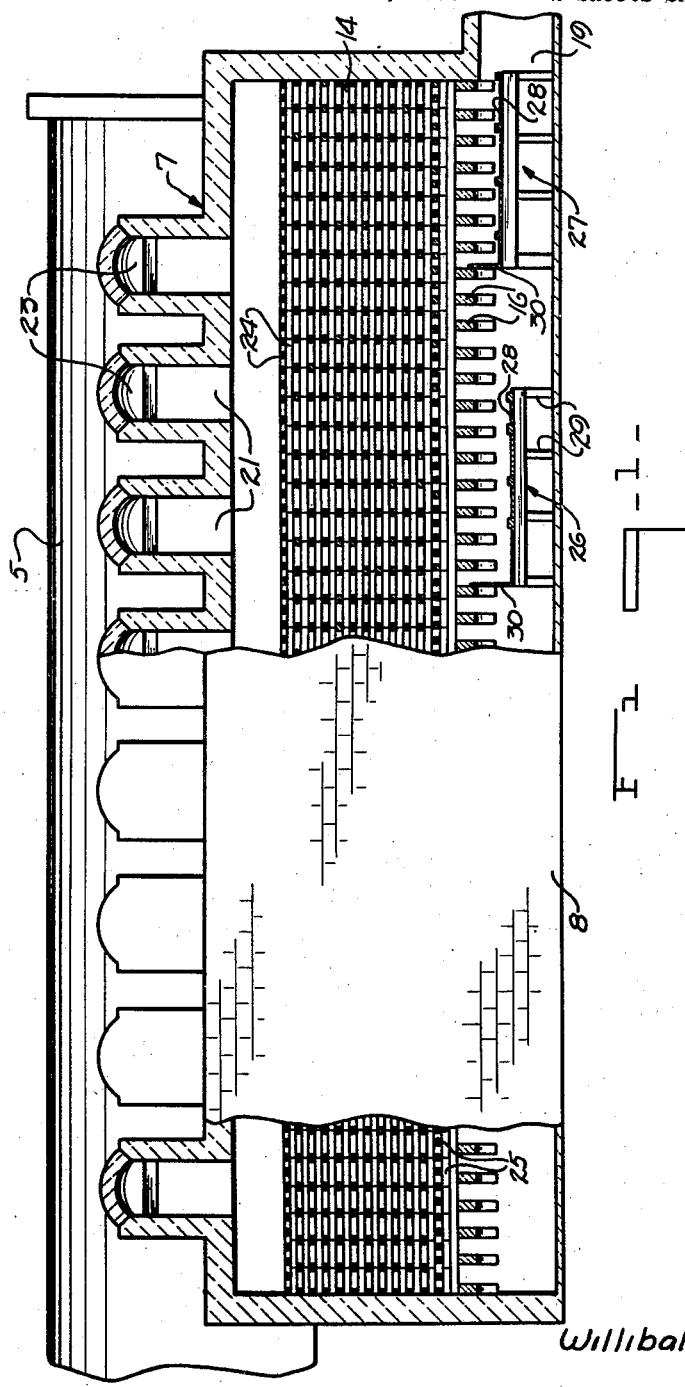
Inventor
Willibald Trinks
By Frank Fraser
Attorney Dec. 15, 1931.  W. TRINKS  1,836,412
REGENERATOR
Filed March 26, 1930   2 Sheets-Sheet 2
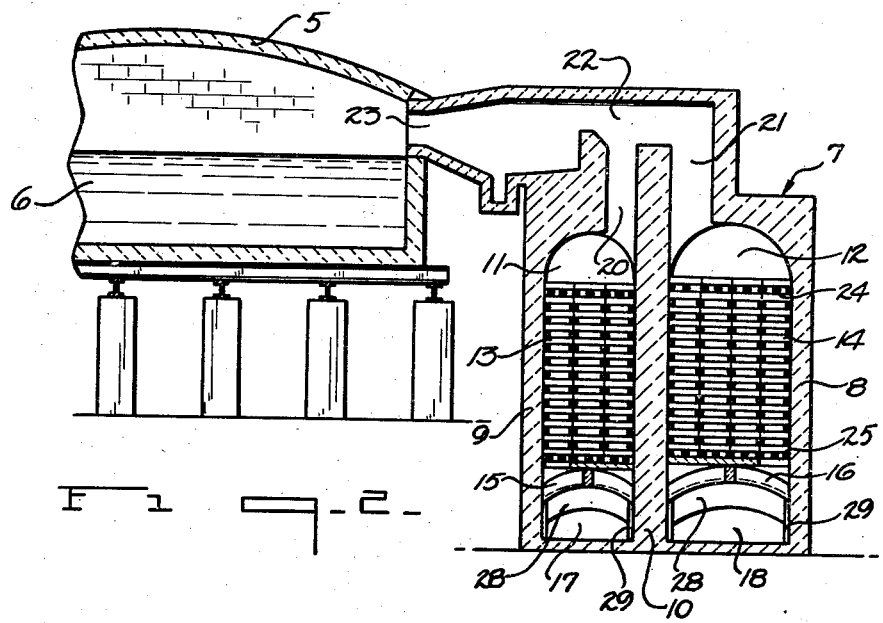
Inventor
Willibald Trinks
By Frank Fraser
Attorney Patented Dec. 15, 1931

1,836,412

UNITED STATES PATENT OFFICE

WILLIBALD TRINKS, OF PITTSBURGH, PENNSYLVANIA, ASSIGNOR TO LIBBEY-OWENS-FORD GLASS COMPANY, OF TOLEDO, OHIO, A CORPORATION OF OHIO

REGENERATOR

Application filed March 26, 1930. Serial No. 439,241.

This invention relates to reversible regenerative furnaces and more particularly to improvements in the regenerators thereof.

While particularly applicable for use in connection with furnaces employed in the melting of glass, the present invention is not necessarily restricted to such use as it may also be incorporated in furnaces within which other kinds of material are being treated. Providing proper regenerative chambers for the absorption of a maximum quantity of heat units from the waste gases and providing for the absorption of the heat units by the incoming air and gas are the primary purposes sought by all regenerative chambers. However, in the reversible regenerative furnaces ordinarily employed in the production of molten glass, the incoming air and outgoing gases are not uniformly spread or distributed throughout the entire checker-chambers with the result that due to this non-uniformity of flow, only about two-thirds of the checker-work is actually utilized for heating the incoming air or gas.

The above disadvantage is apparently caused by the fact that the outgoing gases or products of combustion passing through the checker-work are apt to "channel" so that a large quantity of the waste gas is not brought into contact with the brick surface, with the result that a large quantity of heat units is wasted because they are not absorbed by the checker-work. When the draft is reversed and the air and gas forced through the checker-work, the incoming air or gas is also apt to "channel" through the checker-work and not be brought into contact with the brick surface so that the air or gas is not heated quickly to the temperature desired before it reaches the place of combustion. "Channeling", due to the momentum of the incoming air, not only interferes with the efficiency of heat transfer but also throws too much air into the end port away from the air inlet and calls for additional regulation of air flow which is difficult to obtain.

The non-uniformity of the flow of air through the checker-work creates virtually dead air spaces at the inlet end of the checker-chamber. On the other hand, the outgoing gases pass a considerable distance downwardly through the checker-work before they are spread appreciably so that in the upper half of the checker-work and also between the streams of gases and at one side of the streams, there are practically dead air spaces with only secondary circulation. This non-uniformity of flow consequently results in a much greater fuel consumption and cuts down to a considerable extent the efficiency of the furnace.

The primary object of the present invention is the provision of a novel furnace construction for effecting uniformity of flow of the incoming air and outgoing gases through the checker-chamber to the end that substantially the entire checker-work may be utilized resulting in a substantial saving in fuel consumption and higher furnace efficiency.

Another object of the invention is the provision of a regenerator of improved construction whereby the "channeling" of the incoming air and outgoing gases therethrough and which is caused by inertia, kinetic energy or momentum is materially reduced if not entirely prevented.

Another object of the invention is to provide a checker-work wherein the bricks thereof are so arranged as to better distribute the downflowing gas streams and to increase the effective area of heating surface and to likewise increase the velocity of flow and thus the heat transfer.

A further object of the invention is the provision of baffle means arranged within the checker-chambers beneath the checker-work so as to give a practically uniform upward flow throughout the checker-work and improved uniformity for the downward flow of gas, said baffling means also tending to improve the uniformity of flow through the furnace ports.

Other objects and advantages of the invention will become more apparent during the course of the following description when taken in connection with the accompanying drawings.

In the drawings wherein like numerals are employed to designate like parts throughout the same, Fig. 1 is a side elevation of one end of a furnace partially broken away to better show the improved regenerator provided by the present invention, and Fig. 2 is a transverse section through approximately one half of the furnace.

Referring now more particularly to the accompanying drawings, the numeral 5 designates the melting end of a glass tank furnace, the glass batch being introduced into said furnace at one end and melted therein to produce a mass of molten glass 6, the molten glass then being caused to flow through the furnace toward the point of emergence where it is removed and worked into the desired kind of glassware.

Arranged along each side of the melting end 5 of the furnace is the regenerative heating means 7, including a checker-chamber comprising the outer side walls 8 and 9 and being divided by a vertical wall 10 into gas and air chambers 11 and 12 respectively within which are arranged the brick checker-works 13 and 14. The gas and air chambers 11 and 12, together with the checker-works 13 and 14, extend substantially the entire length of the melting zone of the furnace as shown in Fig. 1. The gas chamber 11 is provided with the checker-arches 15 for supporting the checker-work 13, while similar checker-arches 16 are provided in air chamber 12 for supporting the checker-work 14, said checker-arches 15 and 16 forming distributing spaces or flues 17 and 18 beneath the checker-works, each flue being in communication at one end with a main flue 19. Leading upwardly from the gas and air chambers 11 and 12 are a plurality of pairs of uptakes or passageways 20 and 21 respectively, each pair merging into a horizontal passage 22 terminating in a port 23. While the furnace has been herein described and illustrated in the drawings as being provided with a double regenerator, it is to be strictly understood that the present invention applies just as well to a single regenerator as to a double regenerator.

In accordance with this invention, the bricks forming the upper courses of the checker-works 13 and 14 are arranged relatively closer to one another as indicated at 24 than are the bricks of the adjacent lower courses whereby to provide comparatively small passages therethrough in order to more thoroughly and efficiently distribute or spread the downflowing gas streams, thereby bringing the waste gases into intimate contact with the bricks so that the heat therefrom is readily and quickly absorbed. Also, the bricks in the lower courses of the checker-works are placed considerably closer together as indicated at 25 than the bricks of the adjacent upper courses whereby to increase the heating surface and also to increase the velocity of flow and thus the heat transfer. While only the bricks of the two upper courses and the bricks of the two lower courses are disposed relatively closer together, it will be appreciated that the bricks of three or more upper and lower courses can be arranged in this manner as preferred. The bricks of the checker-work herein provided are so arranged that the heat is quickly and readily given up to the air and that the bricks in turn quickly absorb heat units from the waste gases as the latter are passed through the checker-chamber. It is desirable to obtain a considerable increase in the velocity of the incoming air as it passes upwardly through the lowermost layers or courses of the checker-work and also an increase in the velocity of the gases as they pass downwardly through the uppermost layers or courses thereof, since only by such an increase in velocity can a regulating effect be obtained. It is also necessary that this difference in velocities be obtained within a few layers of checker-brick only. Therefore, the openings in the bottom and in the top layers or courses of the checker-work are about one-half or one-third the size of the openings in the other courses whereby the desired increase in velocities may be achieved.

There is also provided within each of the chambers 11 and 12 beneath the corresponding checker-work, baffle means 26 and 27, each including a horizontal arched baffle plate 28 supported at its opposite sides by the supports 29 and having its forward end upturned as at 30. The horizontal baffle plates 28 of the baffle means 26 and 27 are arranged at different levels with the plate of baffle 26 being placed lower than the plate of baffle 27. The upturned ends 30 preferably project slightly above and fit tightly against the checker-arches 15 and 16. Thus, each baffle is adapted to intercept a given fraction of the air flow entering through flue 19 and direct it upwardly. It has been actually demonstrated that the provision of these baffles will cause a more even and uniform distribution of the incoming air or gas within the checker-chamber and also the outgoing gases with the result that the checker-work will be more thoroughly utilized than has heretofore been the case by causing a more uniform distribution of the air and gases within the checker-chamber. The invention provides for the absorption of a maximum quantity of heat units from the waste gases and also for the transfer of these heat units to the incoming air and gas. Thus, the incoming air or gas will be quickly heated to the temperature desired before it reaches the place of consumption.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A regenerator comprising a regenerative chamber having an inlet at one end, checker-work arranged within the chamber and spaced from the bottom thereof to provide a passage therebeneath, and baffle means positioned within the passage beneath the checker-work and in line with said inlet.

2. A regenerator comprising a regenerative chamber, checker-work arranged within the chamber and spaced from the bottom thereof to provide a passage therebeneath, and horizontal baffle plates positioned within said passage beneath the checker-work and horizontally spaced from one another.

3. A regenerator comprising a regenerative chamber having an inlet at one end, checker-work arranged within the chamber and spaced from the bottom thereof to provide a passage therebeneath, and a horizontal baffle plate positioned within the passage beneath the checker-work and in line with said inlet, said baffle plate having an upturned end at the end remote from the inlet.

4. A regenerator comprising a regenerative chamber, checker-work arranged within the chamber and spaced from the bottom thereof to provide a passage therebeneath, and horizontal baffle plates positioned within said passage beneath the checker-work, said plates being horizontally spaced from one another and arranged at different levels.

5. A regenerator comprising a regenerative chamber having an inlet at one end, checker-work arranged within the chamber and spaced from the bottom thereof to provide a passage therebeneath, and horizontal baffle plates positioned within said passage beneath the checker-work, said plates being horizontally spaced from one another and the plate remote from said inlet being arranged at a lower level than the plate adjacent thereto.

6. A regenerator comprising a regenerative chamber having an inlet at one end, checker-work arranged within the chamber and spaced from the bottom thereof to provide a passage therebeneath, and horizontal baffle plates positioned within said passage beneath the checker-work, said plates being horizontally spaced from one another and the plate remote from said inlet being arranged at a lower level than the plate adjacent thereto, the plates being provided with upturned ends at their ends remote from the inlet.

7. A regenerator comprising a regenerative chamber having an inlet at one end, checker-work arranged within the chamber and spaced from the bottom thereof to provide a passage therebeneath, and means positioned within the passage beneath the checker-work and in line with said inlet for intercepting a given fraction of the air flow entering through the inlet and directing it upwardly.

8. A regenerator comprising a regenerative chamber having an inlet at one end, checker-work arranged within the chamber and spaced from the bottom thereof to provide a passage therebeneath, and a plurality of members positioned within the passage beneath and the checker-work and in line with said inlet for intercepting a given fraction of the air flow entering through the inlet and directing it upwardly.

9. A regenerator comprising a regenerative chamber, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper courses being relatively closer together than the bricks in the adjacent lower courses, and horizontal baffle plates positioned within the passage beneath the checker-work and horizontally spaced from one another.

10. A regenerator comprising a regenerative chamber, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper and lower courses being relatively closer together than the bricks in the intermediate courses, and horizontal baffle plates positioned within said passage beneath the checker-work and horizontally spaced from one another.

11. A regenerator comprising a regenerative chamber having an inlet at one end, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper courses being relatively closer together than the bricks in the adjacent lower courses, and horizontal baffle plates positioned within said passage beneath the checkerwork, said baffle plates being horizontally spaced from one another with the plate remote from said inlet being positioned at a lower level than the plate adjacent thereto.

12. A regenerator comprising a regenerative chamber having an inlet at one end, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper and lower courses being relatively closer together than the bricks in the intermediate courses, and horizontal baffle plates positioned within said passage beneath the checker-work, said baffle plates being horizontally spaced from one another with the plate remote from said inlet being positioned at a lower level than the plate adjacent thereto.

13. A regenerator comprising a regenerative chamber having an inlet at one end, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper courses being relatively closer together than the bricks in the adjacent lower courses, and horizontal baffle plates positioned within said passage beneath the checkerwork and horizontally spaced from one another, said plates being arranged at different levels and having upturned ends at their ends remote from said inlet.

14. A regenerator comprising a regenerative chamber having an inlet at one end, checker-work arranged within the chamber and spaced from the bottom thereof to provide a passage therebeneath, said checker-work comprising a plurality of courses of brick extending in horizontal directions and placed in rows in vertical directions, with alternate courses crossing one another at substantially right angles so as to present vertical passages between the bricks, the bricks in the upper and lower courses being relatively closer together than the bricks in the intermediate courses, and horizontal baffle plates positioned within said passage beneath the checker-work and horizontally spaced from one another, said plates being arranged at different levels and having upturned ends at their ends remote from said inlet.

Signed at Pittsburgh, in the county of Allegheny and State of Pennsylvania, this 21st day of March, 1930.

WILLIBALD TRINKS.